Jan. 17, 1956   R. P. POWERS   2,731,063
SEALING STRIP FOR TUBELESS TIRES
Filed May 22, 1952   3 Sheets-Sheet 1

INVENTOR.
ROBERT P. POWERS
BY Ely, Frye & Hamilton
ATTYS-

Jan. 17, 1956 R. P. POWERS 2,731,063
SEALING STRIP FOR TUBELESS TIRES
Filed May 22, 1952 3 Sheets-Sheet 2
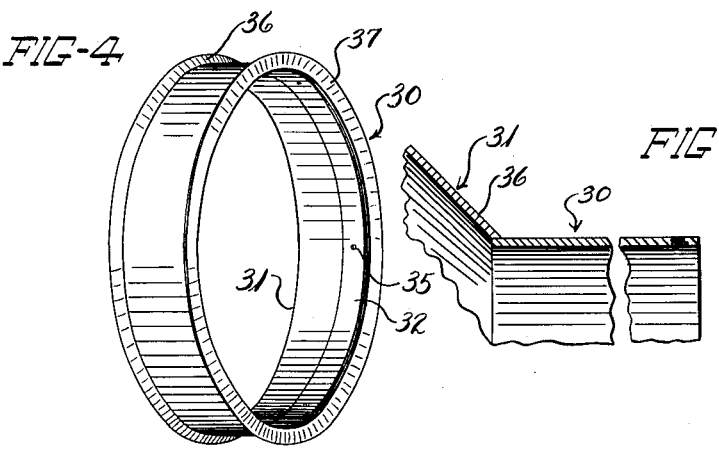
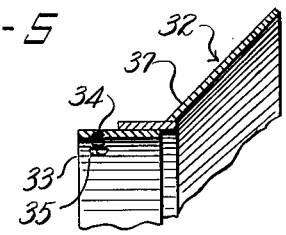
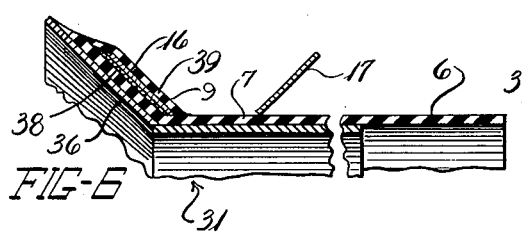
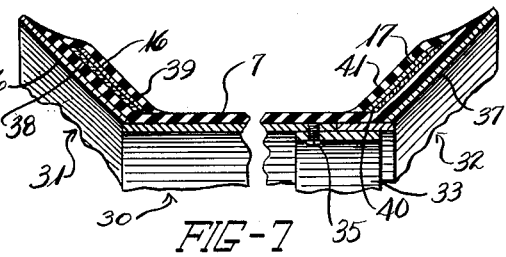
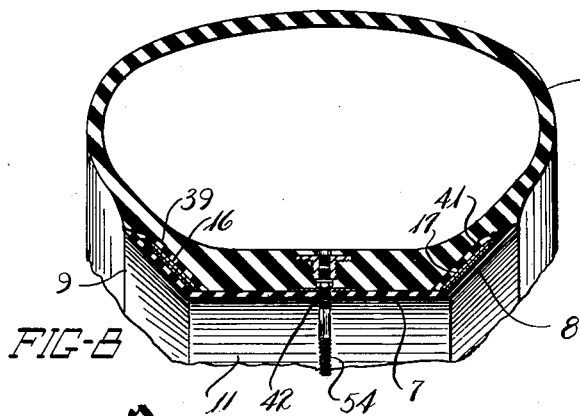
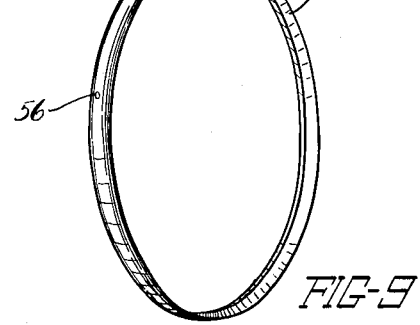
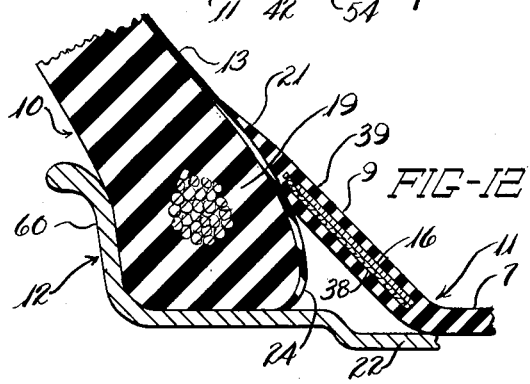
INVENTOR.
ROBERT P. POWERS
BY
ATTYS- Jan. 17, 1956   R. P. POWERS   2,731,063
SEALING STRIP FOR TUBELESS TIRES
Filed May 22, 1952   3 Sheets-Sheet 3

INVENTOR.
ROBERT P. POWERS
BY Ely, Frye & Hamilton
ATTYS-

United States Patent Office 2,731,063
Patented Jan. 17, 1956

2,731,063

SEALING STRIP FOR TUBELESS TIRES

Robert P. Powers, Akron, Ohio, assignor to The Firestone Tire & Rubber Company, Akron, Ohio, a corporation of Ohio Application May 22, 1952, Serial No. 289,232

1 Claim. (Cl. 152—363)

This invention relates to tubeless truck tires and means for providing an air-tight seal at the beads thereof.

Truck tire rims in general use have removable flanges and some have transversely split bases. It is an object of the present invention to make possible the use of such rims within the tubeless tires without exposing the tire inflation medium to the transversely or circumferentially extending splits of tire rims.

A more specific object of the invention is to provide a sealing member which may be conveniently mounted in a tire and rim assembly, which member forms a fluid-tight seal between it and the bead portions of the tire in which the member is mounted.

Another object is to provide an endless sealing member in the form of a band having a body composed of rubber-like material and having a pair of more rigid pressure elements in the marginal edges of said body, said pressure members being adapted to transmit the total tire inflation pressure exerted against their flat surface to the surface of the bead portions of a tire through said rubber-like material along continuous narrow lines of contact and of substantially less area than the flat surface area of said pressure elements exposed to said inflation pressure, thereby providing a sealing pressure along said lines that is greater per square inch than the unit tire inflation pressure.

Other and further objects and advantages of the invention will become readily apparent from the following description when considered in connection with the accompanying drawings in which:

Fig. 4 is a perspective view of a sealing band building drum;

Fig. 5 is a fragmentary sectional view of the drum shown in Fig. 4 with one side removed preparatory to assembling the components of the band of Fig. 2 thereon;

Figs. 6, 7 and 8 are sectional views illustrating successive steps in the fabrication of said band;

Fig. 9 is a perspective view of a molding ring;

Fig. 12, adjacent Fig. 8, is a fragmentary view enlarged of a portion of Fig. 1 taken in the region of a tire bead.

Figure 1:
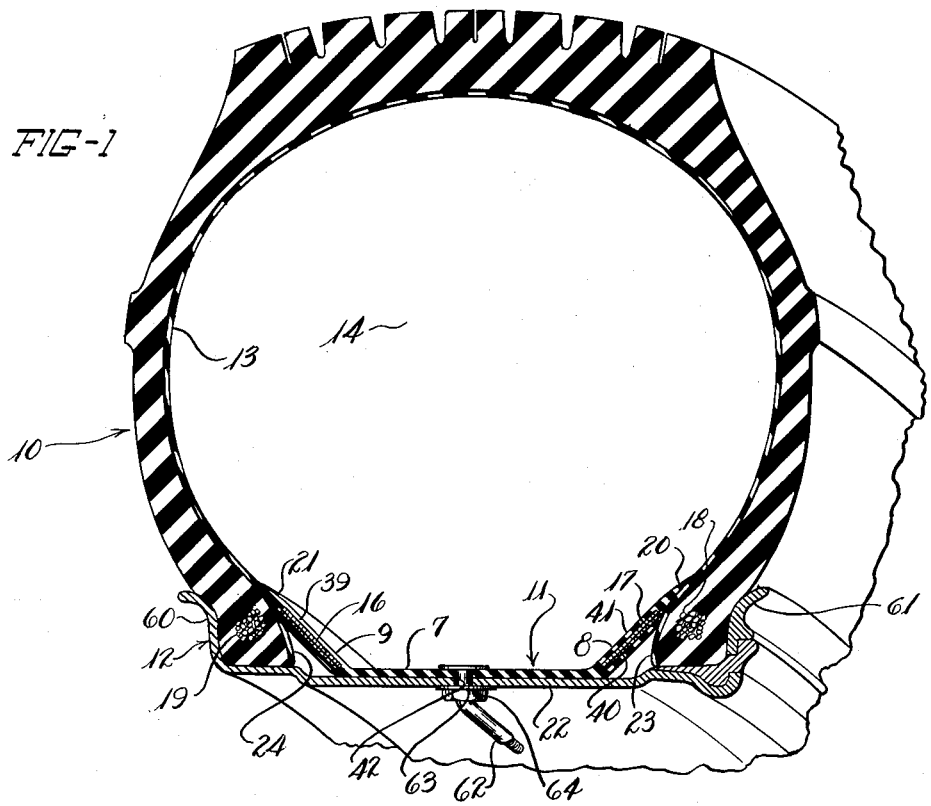
Fig. 1 is a fragmentary perspective view partly in section of a tubeless truck tire and endless sealing band embodying the present invention, said tire and band being shown mounted on a circumferentially split truck tire rim and illustrating the relative positions of the elements of the assembly when the tire is inflated and in service.
Figures 2, 3:
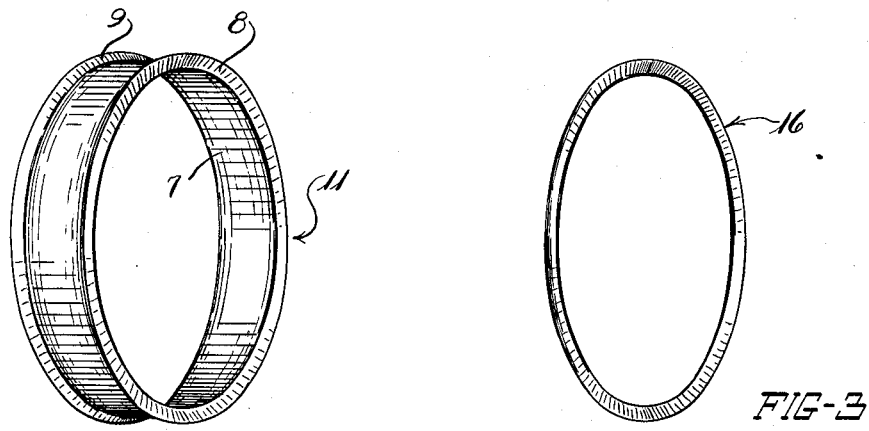
Fig. 2 is a perspective view of the sealing band shown in Fig. 1.
Fig. 3 is a perspective view of one of the inserts of the sealing band of Fig. 1.

By reference to Fig. 1 of the drawing it will be seen that the invention comprises an assembly of a tire, a sealing band and a rim referred to generally as 10, 11 and 12, respectively. The tire 10 comprises the usual elements in its crown, sidewall and bead portions, and in addition, a special air-impervious lining 13 covers the complete inside surface of the tire. Lining 13 may consist of any suitable, air-impervious material, and a lining or coating of Butyl approximately .100" thick has been found satisfactory. However, the invention is not to be limited to a specific type or thickness of impervious lining for the tire.

As will be seen, lining 13 cooperates with the ends of the band 11 to provide an air-retaining wall of the inflated chamber 14 of the tire 10. Lining 13 may be applied to the tire in the form of a strip built into the tire during its fabrication, or it may be calendered as a coating on the first ply stock of the tire fabric, all as will be understood by those familiar with tire building practices.

The band 11 is endless and of channel shape in section having radially and axially outwardly extending slant sides 8 and 9 and a base portion 7. Said band is comprised of air-impervious elastic rubber or rubber-like material such as Butyl and has reinforcing members 16 and 17 in the form of flexible, metallic hoops embedded in or hermetically sealed within its oblique, outer walls. The angularity of the flat surface hoops 16 and 17 is of such relation to the inside contour of beads 18 and 19 of tire 10 that when the radial outer zones 20 and 21 of the band 11, which lie beyond the outer edges of hoops 16, 17, contact the liner 13 of the tire 10, the reinforced portions of band 11 bridge from the base 22 of rim 12 to positions on the beads outwardly of toes 23 and 24 of the beads.

Figure 10:
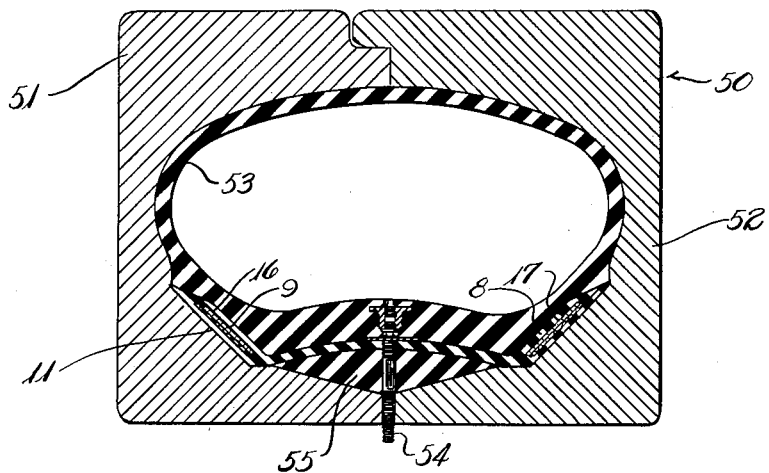
Fig. 10 is a sectional view of a vulcanizing mold showing a band, curing bag and molding ring therein illustrating the transversed arched shape to which the sealing band is molded.

To fabricate the band 11 applicant employs an annular, channeled building drum 30 having radially outwardly flared sides 36 and 37 best shown in Figs. 5 and 7. The drum is circumferentially split, the annular end members 31 and 32 being separable and having attaching means comprising as trip of metal 33 welded or otherwise attached to the inner wall of member 32 and having a plurality of screw holes 34. Threaded holes 34a in cylindrical portion of end member 31 are disposed for alignment with holes 34, in which position the inner edges of members 31 and 32 are in abutting relation. Screws 35, extending through holes 34 and threaded into holes 34a retain members 31 and 32 in assembled relation as will be seen by reference to Fig. 7. A first step in fabricating band 11 is to mount drum member 31, only, upon a suitable revolvable support, not shown. Next, a strip 6 of unvulcanizable Butyl .125" thick is laid about the drum member 31 with the ends of strip 6 either butt or lap spliced. One circumferential edge of said strip of Butyl extends along side 36 to the outer edge thereof, and the other circumferential edge of the strip extends unsupported beyond the edge of member 31 opposite the flared edge 36. A strip of rubberized fabric 38 is then laid upon and entirely around the part of Butyl 6 on the side 36 of band 11 in the position illustrated in Fig. 6, the outer edge of the fabric terminating short of the outer edge of the Butyl strip. The hoops 16 and 17 are next placed on drum member 31 by being passed over and encircling the extended edge of strip 6. Before application to the drum, hoops 16 and 17 are subjected to a cleaning process and then dipped into a solution to provide a coating on the hoops to improve adhesion between the metal of the hoops and the rubber or Butyl of the band 11. One such solution found satisfactory is sold commercially as "Loxite 3,000" by The Firestone Tire & Rubber Company. Hoop 16 is next pressed against the fabric strip 38 so that the edges of strip 38 extend beyond the edges of hoop 16 whereby the edges of the hoop are prevented from contacting and damaging the rubber during molding of the band and when it is used in service. A gum strip 39 is then laid over hoop 16 in a manner to entirely enclose the latter between strips 38 and 39. Drum member 32 is now inserted within the protruding edge of strip 6 and attached to member 31 by means of cap screws 35 as will be understood by reference to Fig. 7. The width of the rubber strip 6 is such that its over-hanging edge will extend up the flared side 37 of member 32 to the outer edge thereof. A rubberized fabric strip 40, the hoop 17 and a gum strip 41 are next positioned on the strip 6 at drum side 37 in the same manner as in the case of side 36. The composite element just described, and identified as band 11, is next removed from drum 30 by first removing screws 35 and detaching member 32 from member 31, after which the band 11 is withdrawn axially from drum member 31. A valve hole 42 is punched through the base portion 43 of band 11, after which the band is laid in mold 50 (of Fig. 10), where it is molded and vulcanized.

The mold 50 is a two-part mold having separable body members 51 and 52, which members have registering recesses therein constituting a mold cavity in which a curing body 53 is disposed to provide pressure to band 11 during molding and vulcanization of said band. The curing bag may be of any type found satisfactory but preferably of rubber or Butyl and having a thick base in the region of the band to be molded. Preparatory to molding, the assembled band 11 is attached by cementing to the base portion of the curing bag 53 before the latter is placed in mold 50. The curing bag has the usual inflation stem 54 which is passed through valve hole 42 of band 11 when the band is attached to said bag. The usual valve stem hole 54a is formed in the base of mold 50, and stem 54 projects therethrough and receives a hose connection, not shown, for passing a bag inflation medium such as air, steam or the like from any suitable source of supply into the curing bag.

The base portion of band 11 is molded arcuate in section, to provide a continuous radially inwardly facing groove about the inner surface of base 7. Because the hoops 16 and 17 have a smaller inside diameter than the maximum outside diameter of the base portion 7, a removable endless molding ring 55, convex in section on its radial outer surface, is placed centrally at the middle of the base of the mold under the base of the band 11. Ring 55 may be composed of a firm vulcanized rubber such as tire tread rubber or rubber reinforced with fabric. A hole 56 in ring 55 permits stem 54 to pass therethrough. Ring 55 is placed in mold 50 concurrently with the band 11 and bag 53. By employing the removable ring 55, applicant is able to mold the base 7 of said band to the contour shown without the problem of passing the metallic hoops 16 or 17 over a base portion of mold 50 having a greater diameter than the inside diameter of said hoop.

After vulcanization, band 11 is removed from the mold, and an inner tube valve stem 62 of the clamped-in type is attached to the base 7 utilizing hole 42 therein for the purpose. It is to be understood that other types of valve stems may be used and attached to band 11 in any manner found satisfactory. The tire is to be inflated through stem 62 in the usual manner of inflating tire inner tubes. In the present case, however, the inflating air through said stem passes into chamber 14 where it is retained by lining 13 and band 11.

In use, the sealing band is mounted in a tire and the tire mounted on a rim (see Fig. 1). In mounting a tire with band 11 therein, it is necessary to press the bead portions of the tire against the sides of said band adjacent the radially outer edge of metal hoops 16 and 17 thereby forming a substantially air-tight seal between said band and tire. Upon the forming of an air seal at the edges of the band, the internal pressure within chamber 14 increases as the tire inflation proceeds, and such pressure is exerted against the angular flat surfaces of hoops 16 and 17. Since members 16 and 17 will resist deformation by the fluid pressure of the inflation medium, they will be moved apart toward the beads of the tire until their upper edges press the thin wall of rubber covering the hoop edges against the tire and start the tire beads toward rim flanges 60 and 61. Hoops 16 and 17 will follow beads 19 and 18 as they move transversely outwardly into contact with the side flanges 60 and 61, respectively, of rim 12. Since the base 7 is relatively thin, it is easily stretched, crowded upon itself or even folded without harm to itself or its proper functioning as a sealing wall. The force with which the outer edge of said hoops press the rubber against the liner 13 is considerably in excess of the internal pressure within the tire. This is due to the total pressure against each hoop being exerted and confined along the substantial line contact of the covering of the hoop's radial outer edges with lining 13. For example, if a hoop 16 for a 9.00–20 truck tire had a lateral surface area of sixty square inches, which would be approximately the case, and the tire was inflated to fifty pounds, then the total pressure against such hook would be three thousand pounds. Such pressure will press the hoop edge area of the band against the surface of lining 13 along a relatively narrow line. There is also a frictional resistance to the lateral movement of the edges of the band as the bands contact with the tire rim at the radial inner edge of the members 16 and 17. There is further resistance in the stretching of base 7, if such stretch is present in any particular instance. The amount of stretch to which the base is subjected may be controlled by the extent the middle of the base is arched combined with the overall width of the band. Such distortion normally would bulge the base of the band radially inwardly of the tire beads where it would interfere with the application of said beads to the tire rim. It is for this reason that the middle of base 7 transversely arched in section is formed with a greater diameter than the inside diameter of its edges (see Figs. 10 and 11) so that it bulges radially outwardly when the sides of said band are pressed toward each other.

According to the assembly in which band 11 is to be used, the overall width between its edges 20 and 21 is predetermined so that these edges will contact the inside surface of the tire before the tire is inflated. For example, a band having an overall width of 5 9/16" for a 9.00 tire of 10 ply rating mounted on a 7" truck tire rim has been found satisfactory. Due to the flexible nature of the rubber-like edges of band 11, considerable lee-way in tolerance of width between the tire beads on the tire rim is provided. Such tolerance is important since the distance between tire beads varies due to manufacturing variations and between tires of different ply rating or types. The present invention, however, provides an additional feature of width adjustment as will be seen from the following explanation of the manner band 11 combines with tire 10 and rim 12 in service to provide said air-tight chamber 14.

Figure 11:
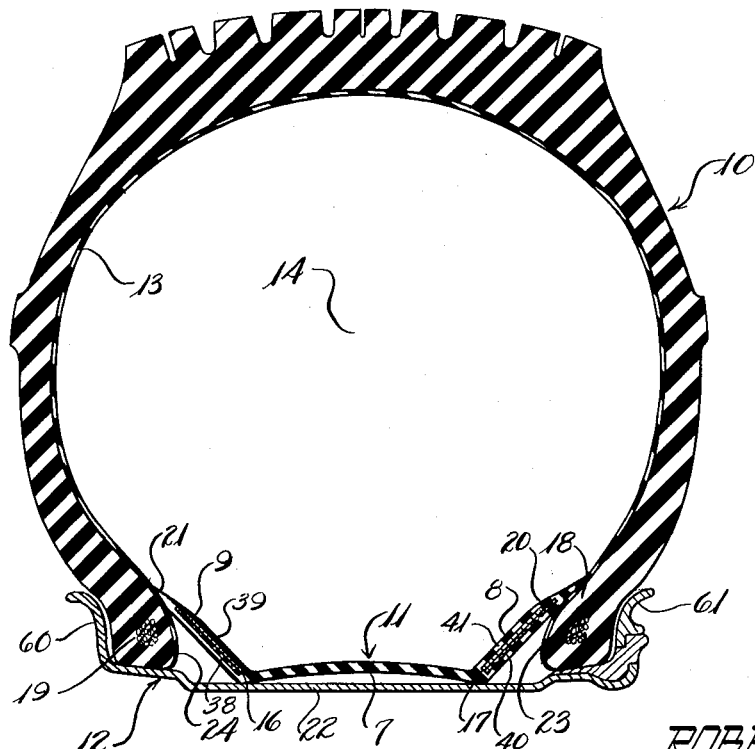
Fig. 11 is a sectional view of a tire mounted on a rim illustrating the relative positions of the tire beads and sealing band before inflation of the tire.

Referring now to Fig. 11, there is indicated the relative positions of band 11, the tire beads 18 and 19, and the rim 12 at the beginning of the inflation of the tire. The contact of the flexible rubber-like band edges 20 and 21 with the smooth surface of the lining 13 of the tire forms an air-tight seal therewith originally, which seal is rendered even more effective by the rush of inflating air into the tire, which flutters said edges into such airtight seal. The friction between the band base and the base of the rim has been found to be insufficient to materially detract from the high pressure of the outer edge of the hoops against said lining. It has also been found that the line of contact of the band 11 against lining 13 at the outer edge of hoops 16 and 17 provides a dependable fluid-tight seal between the band and the said lining. It is an important feature of the invention that once band 11 establishes a seal with said lining the hoops 16 and 17 never loose their sealing pressure against lining 13 through said thin rubber-like covering until the tire is deflated.

A preferred embodiment of the present invention has been described, but it is to be understood that such embodiment is to be considered from illustrative standpoints and that the invention is to be limited only by the prior art and the appended claim.

What is claimed is:

The combination of a tubeless tire having bead portions, a split tire rim on which the tire is mounted and a tire sealing band, the inside surface of the tire to be exposed to the tire inflating medium being covered with a lining which is impervious to such medium, said band having continuous edge portions which in section extend radially and axially outwardly, the radial outer margin of each edge portion contacting said lining to form a seal against escape of the inflating medium, said band being provided with an inflating valve communicating with the inside of said tire, said band having rubbery material extending its overall width and a base portion contacting said rim, each said edge portion being reinforced with a hoop joined thereto, said hoop having a peripheral edge that forms a circle, said hoop being composed of substantially rigid material and having a flat surface, of substantial width relative to the over-all width of said band, lying in an annular zone angular to the axis of said tire, said angularity being such, relative to the angularity of the inside wall of the tire beads, that when said outer margin of each said edge portion contacts said lining said edges of the band will bridge over and be spaced from the toes of the tire beads.

References Cited in the file of this patent

UNITED STATES PATENTS

| | | |
|---|---|---|
| 559,873 | Sweetland | May 12, 1896 |
| 1,445,443 | Leeth et al. | Feb. 13, 1923 |
| 1,468,099 | Belt | Sept. 18, 1923 |
| 1,637,599 | Ballew | Aug. 2, 1927 |
| 1,827,668 | Musselman | Oct. 13, 1931 |
| 1,886,470 | Daddio | Nov. 8, 1932 |
| 2,419,075 | Herzegh | Apr. 15, 1947 |
| 2,501,644 | Kraft et al. | Mar. 21, 1950 |
| 2,530,213 | Sutton | Nov. 14, 1950 |
| 2,563,788 | Keefe | Aug. 7, 1951 |
| 2,587,470 | Herzegh | Feb. 26, 1952 |
| 2,597,550 | Tritt | May 20, 1952 |

FOREIGN PATENTS

| | | |
|---|---|---|
| 10,272 | Great Britain | 1898 |